(12) United States Patent
Zou

(10) Patent No.: US 10,501,662 B2
(45) Date of Patent: Dec. 10, 2019

(54) BONDING METHOD AND CONVEYOR BELT

(71) Applicant: The Yokohama Rubber Co., Ltd., Minato-ku, Tokyo (JP)

(72) Inventor: Deqing Zou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/533,313

(22) PCT Filed: Dec. 3, 2015

(86) PCT No.: PCT/JP2015/084039
§ 371 (c)(1),
(2) Date: Jun. 5, 2017

(87) PCT Pub. No.: WO2016/088844
PCT Pub. Date: Jun. 9, 2016

(65) Prior Publication Data
US 2017/0362474 A1    Dec. 21, 2017

(30) Foreign Application Priority Data

Dec. 5, 2014 (JP) .................. 2014-246983
Dec. 5, 2014 (JP) .................. 2014-247154

(51) Int. Cl.
| | | |
|---|---|---|
| *C09J 123/08* | (2006.01) | |
| *B29C 65/48* | (2006.01) | |
| *F16G 3/10* | (2006.01) | |
| *C09J 5/00* | (2006.01) | |
| *C08J 5/12* | (2006.01) | |
| *C08K 5/14* | (2006.01) | |
| *C09J 11/06* | (2006.01) | |
| *C08K 3/04* | (2006.01) | |
| *C09J 5/06* | (2006.01) | |
| *C08L 23/08* | (2006.01) | |
| *C08K 3/22* | (2006.01) | |

(52) U.S. Cl.
CPC ............ *C09J 123/08* (2013.01); *B29C 65/48* (2013.01); *C08J 5/121* (2013.01); *C08J 5/124* (2013.01); *C08K 3/04* (2013.01); *C08K 5/14* (2013.01); *C08L 23/08* (2013.01); *C08L 23/0815* (2013.01); *C09J 5/00* (2013.01); *C09J 5/06* (2013.01); *C09J 11/06* (2013.01); *C09J 123/0807* (2013.01); *F16G 3/10* (2013.01); *C08J 2323/16* (2013.01); *C08J 2323/18* (2013.01); *C08J 2423/16* (2013.01); *C08J 2423/18* (2013.01); *C08K 2003/2296* (2013.01); *C08L 2205/025* (2013.01); *C08L 2205/03* (2013.01); *C09J 2423/16* (2013.01); *C09J 2423/166* (2013.01)

(58) Field of Classification Search
CPC ............ C09J 123/0807; C09J 123/0815; C09J 123/18; C09J 123/20; C09J 123/22; C09J 123/16; C09J 123/10; C09J 123/14; C09J 123/08; B29C 65/48; F16G 3/10

USPC .................................... 156/338, 326
See application file for complete search history.

(56) References Cited

U.S. PATENT DOCUMENTS

| | | | | |
|---|---|---|---|---|
| 2,418,025 | A | * 3/1947 | Garvey | .............. C08J 5/124 |
| | | | | 156/315 |
| 4,767,658 | A | 8/1988 | Lorenz | |
| 5,656,693 | A | * 8/1997 | Ellul | ................ C08L 23/16 |
| | | | | 525/171 |
| 2002/0042317 | A1* | 4/2002 | South | .................. F16G 1/28 |
| | | | | 474/264 |
| 2003/0170469 | A1* | 9/2003 | Ikuta | ................... B32B 25/08 |
| | | | | 428/447 |
| 2005/0247391 | A1* | 11/2005 | Ikuta | ................... B60C 1/00 |
| | | | | 152/565 |
| 2009/0081473 | A1* | 3/2009 | Ohno | .................. B29D 29/08 |
| | | | | 428/515 |
| 2010/0119855 | A1* | 5/2010 | Ouhadi | ............. B29C 45/1615 |
| | | | | 428/515 |
| 2010/0298515 | A1 | 11/2010 | Marchand et al. | |
| 2010/0330352 | A1 | 12/2010 | Feng et al. | |
| 2011/0032621 | A1 | 2/2011 | Marchand et al. | |
| 2015/0290918 | A1 | 10/2015 | Feng et al. | |
| 2016/0319161 | A1* | 11/2016 | Haufe | .................. C09D 4/00 |

FOREIGN PATENT DOCUMENTS

| | | |
|---|---|---|
| CN | 101983213 | 3/2011 |
| CN | 101983214 | 3/2011 |
| JP | S48-101471 | 12/1973 |
| JP | S53-080487 | 7/1978 |
| JP | S61-111332 | 5/1986 |
| JP | S61-233525 | 10/1986 |
| JP | H09-040814 | 2/1997 |
| JP | 2008-248003 | 10/2008 |
| JP | 2011178917 A * | 9/2011 |

(Continued)

OTHER PUBLICATIONS

Machine translation of JP-2011178917, Sep. 2011.*
International Search Report for International Application No. PCT/JP2015/084039 dated Mar. 1, 2016, 4 pages, Japan.

*Primary Examiner* — Philip C Tucker
*Assistant Examiner* — Jimmy R Smith, Jr.
(74) *Attorney, Agent, or Firm* — Thorpe North & Western

(57) ABSTRACT

A method is provided for adhering prescribed adherend rubbers to one another using a rubber for adhesion obtained from a rubber composition for adhesion containing an ethylene-α-olefin copolymer (X2) and an organic peroxide (Y2) at the adhesion interface between the adherend rubbers. The ethylene-α-olefin copolymer (X2) contained in the rubber composition for adhesion contains an ethylene-1-butene copolymer. The ethylene-1-butene copolymer satisfies prescribed values of the number average molecular weight and the molecular weight distribution. The content of the ethylene-1-butene copolymer is from 60 to 100 mass % of the total mass of the ethylene-α-olefin copolymer (X2).

8 Claims, No Drawings

(56) References Cited

FOREIGN PATENT DOCUMENTS

| JP | 2012-532288 | 12/2012 |
|---|---|---|
| WO | WO 2009/097560 | 8/2009 |
| WO | WO 2009/097565 | 8/2009 |
| WO | WO 2011/002672 | 1/2011 |

* cited by examiner

BONDING METHOD AND CONVEYOR BELT

TECHNICAL FIELD

The present technology relates to a method of adhering and a conveyor belt.

BACKGROUND ART

For many large-scale rubber products including conveyor belts, rubber crawlers, and large-scale gaskets made of rubber, a procedure of disposing an unvulcanized rubber for adhesion (also referred to as "tie rubber") at an adhesion interface upon adhesion (bonding) of vulcanized rubber components to be adhered or a vulcanized rubber component to an unvulcanized rubber component has been conventionally used.

For example, in Japanese Unexamined Patent Application Publication No. 2008-248003A, the applicant of the present technology has proposed "a method of adhering together adherend rubbers including a rubber composition containing a diene-based rubber and a sulfur-containing organic compound, using an unvulcanized rubber for adhesion including a rubber composition containing a diene-based rubber and a sulfur-containing organic compound at the adhesive interface between the adherend rubbers, wherein a total sulfur amount X of the adherend rubber is from 0.16 to 0.54 parts by mass relative to 100 parts by mass of the diene-based rubber in the adherend rubber, a total sulfur amount Y of the rubber for adhesion is from 0.20 to 1.00 parts by mass relative to 100 parts by mass of the diene-based rubber in the rubber for adhesion, and a ratio (Y/X) of the total sulfur amount Y to the total sulfur amount X is from 1.25 to 2.50".

However, in the method of adhering described in Japanese Unexamined Patent Application Publication No. 2008-248003A, a vulcanization (crosslinking) system using an organic peroxide such as dicumyl peroxide is not considered since an object thereof is to "provide an adhesion method that is capable of favorably adhering together rubber products that each contain a sulfur-containing organic compound such as morpholine disulfide and have excellent heat resistance." For example, this shows that the adhesion method cannot be applied to adhesion of a heat-resistant conveyor belt including a cover rubber containing of a rubber composition containing an ethylene-α-olefin copolymer and the like.

SUMMARY

The present technology provides a method that is capable of favorably adhering together rubber products that each contain an organic peroxide such as dicumyl peroxide and have excellent heat resistance, and a conveyor belt produced using the adhesion method.

As a result of conducting dedicated research, the present inventor discovered that in a system containing an ethylene-α-olefin copolymer, by including a specific amount of an ethylene-1-butene copolymer having a specific number average molecular weight (Mn) and a specific molecular weight distribution (Mw/Mn) in a rubber composition for adhesion, even adherend rubbers (rubber products) containing an organic peroxide and having excellent heat resistance can be satisfactorily adhered to one another, and the present inventor thereby completed the present technology.

In addition, as a result of conducting dedicated research, the present inventor discovered that in a system containing an ethylene-α-olefin copolymer, by including a specific amount of an ethylene-propylene copolymer having a specific number average molecular weight (Mn) and a specific molecular weight distribution (Mw/Mn) in a rubber composition for adhesion, even adherend rubbers (rubber products) containing an organic peroxide and having excellent heat resistance can be satisfactorily adhered to one another, and the present inventor thereby completed the present technology.

Specifically, the inventor discovered that the problem described above can be solved by the following features.

[1]

A method of adhering adherend rubbers obtained from a rubber composition for an adherend containing an ethylene-α-olefin copolymer (X1) and an organic peroxide (Y1) to one another using a rubber for adhesion obtained from a rubber composition for adhesion containing an ethylene-α-olefin copolymer (X2) and an organic peroxide (Y2) at an adhesion interface between the adherend rubbers;

the ethylene-α-olefin copolymer (X2) contained in the rubber composition for adhesion containing an ethylene-1-butene copolymer;

the ethylene-1-butene copolymer having a number average molecular weight (Mn) of not less than 80000 and a molecular weight distribution (Mw/Mn) of not greater than 3 as determined from a weight average molecular weight (Mw) and the number average molecular weight (Mn); and a content of the ethylene-1-butene copolymer being from 60 to 100 mass % of a total mass of the ethylene-α-olefin copolymer (X2) contained in the rubber composition for adhesion.

[2]

A method of adhering adherend rubbers obtained from a rubber composition for an adherend containing an ethylene-α-olefin copolymer (X1) and an organic peroxide (Y1) to one another using a rubber for adhesion obtained from a rubber composition for adhesion containing an ethylene-α-olefin copolymer (X2) and an organic peroxide (Y2) at an adhesion interface between the adherend rubbers;

the ethylene-α-olefin copolymer (X2) contained in the rubber composition for adhesion containing an ethylene-propylene copolymer;

the ethylene-propylene copolymer having a number average molecular weight (Mn) of not less than 100000 and a molecular weight distribution (Mw/Mn) of not greater than 3 as determined from a weight average molecular weight (Mw) and the number average molecular weight (Mn); and a content of the ethylene-propylene copolymer being from 30 to 100 mass % of a total mass of the ethylene-α-olefin copolymer (X2) contained in the rubber composition for adhesion.

[3]

The adhesion method according to [1], wherein an ethylene content of the ethylene-1-butene copolymer is from 50 to 90 mass %.

[4]

The adhesion method according to [2], wherein an ethylene content of the ethylene-propylene copolymer is from 40 to 80 mass %.

[5]

The adhesion method according to any one of [1] to [4] used in bonding of conveyor belts to one another.

[6]

A conveyor belt obtained by adhesion with the adhesion method described in [5].

As described below, the present technology can provide a method that is capable of favorably adhering adherend rubbers (rubber products) together that each contain an organic peroxide such as dicumyl peroxide and have excellent heat resistance, and a conveyor belt produced using the method of adhering.

DETAILED DESCRIPTION

The method of adhering of the present technology and the conveyor belt of the present technology will be described below for each embodiment thereof.

Note that, in the present specification, numerical ranges indicated using "(from) . . . to . . . " include the former number as the lower limit value and the later number as the upper limit value.

First Embodiment

Method of Adhering

The method of adhering according to a first embodiment is a method of adhering adherend rubbers obtained from a rubber composition for an adherend containing an ethylene-α-olefin copolymer (X1) and an organic peroxide (Y1) to one another using a rubber for adhesion obtained from a rubber composition for adhesion containing an ethylene-α-olefin copolymer (X2) and an organic peroxide (Y2) at the adhesion interface between the adherend rubbers. The ethylene-α-olefin copolymer (X2) contained in the rubber composition for adhesion contains an ethylene-1-butene copolymer. The ethylene-1-butene copolymer has a number average molecular weight (Mn) of not less than 80000 and a molecular weight distribution (Mw/Mn) of not greater than 3 as determined from the weight average molecular weight (Mw) and the number average molecular weight (Mn). The content of the ethylene-1-butene copolymer is from 60 to 100 mass % of the total mass of the ethylene-α-olefin copolymer (X2) contained in the rubber composition for adhesion.

In the first embodiment, including a specific amount of an ethylene-1-butene copolymer having a specific number average molecular weight (Mn) and a specific molecular weight distribution (Mw/Mn) (also called a specific "ethylene-1-butene copolymer" hereafter) in a rubber composition for adhesion makes it possible for adherend rubbers (rubber products) to be satisfactorily adhered to one another.

Although the details of this mechanism are not clear, the mechanism is presumed to be roughly as follows.

Specifically, an ethylene-1-butene copolymer having a number average molecular weight (Mn) of not less than 80000 can be considered to be in a state in which the molecular chains constituting the copolymer are sufficiently long. When an ethylene-1-butene copolymer having sufficiently long molecular chains is used in this way, the force intertwining the copolymer and an adherend rubber becomes strong.

In addition, an ethylene-1-butene copolymer having a number average molecular weight (Mn) of not less than 80000 and a molecular weight distribution (Mw/Mn) of not greater than 3 can be considered to be in a state in which the abundance of long molecular chains is high. It is presumed that using an ethylene-1-butene copolymer in which the abundance of long molecular chains is high increases the frequency of the intertwining of the copolymer and an adherend rubber.

Using a rubber for adhesion obtained from a rubber composition for adhesion containing a specific amount of an ethylene-1-butene copolymer having a specific number average molecular weight (Mn) and a specific molecular weight distribution (Mw/Mn) causes the effects described above to operate synergistically, which allows adhered rubbers to satisfactorily adhere to one another.

Next, the adherend rubber and the rubber for adhesion of the first embodiment, and a specific aspect of adhering them to one another will be described.

Adherend Rubber

In the first embodiment, the adherend rubber is not particularly limited as long as it is obtained from a rubber composition described below containing an ethylene-α-olefin copolymer (X1) and an organic peroxide (Y1). The adherend rubber may be an unvulcanized rubber (hereinafter referred to as "unvulcanized rubber component") or a vulcanized rubber (hereinafter referred to as "vulcanized rubber component"), and is preferably an unvulcanized rubber component.

Further, the adhesion of adherend rubbers to one another includes not only an aspect of adhering vulcanized rubber components or unvulcanized rubber components to one another, but also an aspect of adhering a vulcanized rubber component to an unvulcanized rubber component.

Ethylene-α-Olefin Copolymer (X1)

The adherend rubber composition in the first embodiment contains an ethylene-α-olefin copolymer (X1).

Examples of α-olefins constituting such an ethylene-α-olefin copolymer (X1) include ethylene, propylene, 1-butene, 1-pentene, 1-hexene, 1-heptene, and 1-octene.

Specific examples of ethylene-α-olefin copolymers (X1) include an ethylene-propylene copolymer (EPM), an ethylene-1-butene copolymer (EBM), an ethylene-1-hexene copolymer, an ethylene-1-octene copolymer, and an ethylene-4-methyl-pentene-1 copolymer. One type of the ethylene-α-olefin copolymer may be used alone, or two or more types thereof may be used in combination.

Organic Peroxide (Y1)

The adherend rubber composition in the first embodiment contains an organic peroxide (Y1). The organic peroxide (Y1) is not particularly limited, and a conventionally known substance may be used.

Specific examples of the organic peroxide (X1) include dicumyl peroxide, di-t-butyl peroxide, 1,3-bis(t-butylperoxyisopropyl)benzene, n-butyl 4,4'-di(t-butylperoxy)valerate, and 2,5-dimethyl-2,5-bis(t-butylperoxy)hexane. One type of the organic peroxide may be used alone, or two or more types thereof may be used in combination.

As the organic peroxide (Y1), a commercially available product can be used. Specific examples thereof include 1,3-bis(t-butylperoxyisopropyl)benzene (trade name "Perkadox 14-40," available from Kayaku Akzo Corporation).

The content of the organic peroxide (Y1) is preferably from 0.011 to 0.020 molar equivalents and more preferably from 0.013 to 0.018 molar equivalents with respect to the ethylene-α-olefin copolymer (X1) contained in the rubber composition for the adherend.

Other Components

The adherend rubber composition in the first embodiment preferably contains carbon black. The carbon black contained in the adherend rubber composition is not particularly limited, and a conventionally known substance may be used.

Specific examples of the carbon black include furnace carbon blacks such as SAF, ISAF, HAF, FEF, GPE, and SRF, and one of these can be used alone, or two or more types can be used in combination.

The content when the carbon black described above is contained is preferably from 30 to 60 parts by mass per 100 parts by mass of the ethylene-α-olefin copolymer (X1) contained in the adherend rubber composition in the first embodiment.

In addition to the components described above, the rubber composition of the adherend rubber in the first embodiment may contain ingredients such as a filler other than carbon black (e.g., silica), an anti-aging agent, an antioxidant, a pigment (dye), a plasticizer, a softening agent, a flame retardant, a vulcanization accelerator, a wax, an antistatic agent, and a processing aid.

Method for Producing Adherend Rubber Composition

The adherend rubber composition in the first embodiment described above may be produced by a method such as kneading each of the components described above with a Banbury mixer.

In addition, an unvulcanized rubber component serving as the adherend rubber described above is the adherend rubber composition itself in the first embodiment.

Further, a vulcanized component serving as the adherend rubber described above can be obtained by vulcanizing the adherend rubber composition of the first embodiment described above under heating conditions at a temperature of approximately from 140 to 150° C. for 0.5 hours.

Rubber for Adhesion

In the first embodiment, the rubber for adhesion is not particularly limited as long as it is obtained from a rubber composition for adhesion described below containing an ethylene-α-olefin copolymer (X2) and an organic peroxide (Y2) and the ethylene-α-olefin copolymer (X2) contains a specific amount of a specific ethylene-1-butene copolymer. The rubber for adhesion may be an unvulcanized rubber composition or a vulcanized rubber composition but is preferably an unvulcanized rubber composition.

Ethylene-α-Olefin Copolymer (X2)

The rubber composition for adhesion in the first embodiment contains an ethylene-α-olefin copolymer (X2).

Specific Ethylene-1-Butene Copolymer

The ethylene-α-olefin copolymer (X2) contained in the first embodiment contains a specific ethylene-1-butene copolymer. In the first embodiment, the specific ethylene-1-butene copolymer refers to a copolymer having a number average molecular weight of not less than 80000 and a molecular weight distribution (Mw/Mn) of not greater than 3, as described above.

The specific ethylene-1-butene copolymer that is used has a Mooney viscosity at 125° C. of preferably not less than 19, more preferably from 19 to 100, and even more preferably from 19 to 60. Using a specific ethylene-1-butene copolymer having a Mooney viscosity at 125° C. of not less than 19 further enhances the adhesion between the adherend rubbers. In addition, as a result of the Mooney viscosity being not greater than 100, it becomes easy to control the viscosity or the like of the rubber composition for adhesion to within a preferable range, which tends to enhance the handleability of the rubber composition for adhesion.

Here, the details of the mechanism that further enhances the adhesion between adhered rubbers when the Mooney viscosity of the specific ethylene-1-butene copolymer contained in the rubber composition for adhesion in the first embodiment is high (that is, not less than 19) are not clear, but the mechanism is presumed to be due to the following reasons.

Specifically, there is a correlation between the Mooney viscosity and the molecular chain length, and an ethylene-1-butene copolymer having a high Mooney viscosity can be considered to have many long molecular chains. When an ethylene-1-butene copolymer having many sufficiently long molecular chains is used in this way, the force intertwining the copolymer and an adherend rubber becomes strong. This may make it possible to more satisfactorily adhere adherend rubbers to one another.

In this specification, the Mooney viscosity at 125° C. is a viscosity (ML1+4, 125° C.) measured using a L-type rotor at a test temperature of 125° C. for a preheating time of 1 minute and a rotor-rotation time of 4 minutes in accordance with JIS (Japanese Industrial Standard) K6300-1-2001.

A commercially available product may be used as the ethylene-1-butene copolymer (EBM). Specific examples thereof include an ethylene-1-butene copolymer (trade name: "Engage 7467") having a Mooney viscosity at 125° C. of 19 and an ethylene-1-butene copolymer (trade name: "Engage 7487") having a Mooney viscosity at 125° C. of 47.

The number average molecular weight (Mn) of the specific ethylene-1-butene copolymer needs to be not less than 80000 and is preferably from 80000 to 200000 and more preferably from 120000 to 160000.

Using an ethylene-1-butene copolymer having a number average molecular weight (Mn) of not less than 80000 in this way enhances the adhesion between the adherend rubbers. In addition, using an ethylene-1-butene copolymer having a number average molecular weight (Mn) of not greater than 200000 makes it easy to control the viscosity or the like of the rubber composition for adhesion to within a preferable range, which tends to enhance the handleability of the rubber composition for adhesion. On the other hand, when the number average molecular weight (Mn) of the ethylene-1-butene copolymer is less than 80000, the adhesive strength of the rubber for adhesion decreases, and the adhesion between the adherend rubbers decreases.

The molecular weight distribution (Mw/Mn) of the specific ethylene-1-butene copolymer needs to be not greater than 3 and is preferably from 1.5 to 2.5 and more preferably from 1.8 to 2.2.

When the molecular weight distribution (Mw/Mn) of the ethylene-1-butene copolymer is not greater than 3 as described above, the adhesion between the adherend rubbers is enhanced. On the other hand, when the molecular weight distribution (Mw/Mn) exceeds 3, the adhesive strength of the rubber for adhesion decreases, and the adhesion between the adherend rubbers decreases.

Note that setting the molecular weight distribution (Mw/Mn) to less than 1.5 involves technical difficulties, so the lower limit of the molecular weight distribution (Mw/Mn) is preferably not less than 1.5.

The weight average molecular weight (Mw) and the number average molecular weight (Mn) in the present technology are values determined by gel permeation chromatography (GPC) measurements on the basis of polystyrene. The molecular weight distribution (Mw/Mn) in the present technology is a value calculated from the weight average molecular weight (Mw) and the number average molecular weight (Mn) determined in this way.

The ethylene content of the specific ethylene-1-butene copolymer is preferably from 50 to 90 mass % and more preferably from 60 to 80 mass %. When the ethylene content is not less than 50 mass %, the adhesion at room temperature between adherend rubbers tends to be further enhanced. In addition, when the ethylene content is not greater than 90 mass %, the processability tends to be enhanced.

Note that the ethylene content in the present technology is measured by a Fourier transform infrared spectrophotometer (FT-IR). Specifically, a device equivalent to "FT-200" (trade name, manufactured by Horiba, Ltd.) may be used.

The content of the specific ethylene-1-butene copolymer needs to be from 60 to 100 mass % and is preferably from 60 to 90 mass %, more preferably from 60 to 80 mass %, and even more preferably from 60 to 70 mass % of the total mass (100 mass %) of the ethylene-α-olefin copolymer (X2) contained in the aforementioned rubber composition for adhesion in the first embodiment.

When the content of the specific ethylene-1-butene copolymer is not less than 60 mass %, the adhesive strength of the rubber for adhesion is exhibited favorably.

In particular, when the content of the specific ethylene-1-butene copolymer is from 60 to 70 mass %, the adhesive strength of the rubber for adhesion in a high-temperature environment (for example, approximately 120 to 180° C.) tends to be further enhanced.

On the other hand, when the content of the specific ethylene-1-butene copolymer is less than 60 mass %, the adhesive strength of the rubber for adhesion is not sufficiently exhibited, and the adhesion between the adherend rubbers decreases.

Other Ethylene-α-Olefin Copolymers

The ethylene-α-olefin copolymer (X2) in the first embodiment may contain an ethylene-α-olefin copolymer other than a specific ethylene-1-butene copolymer.

In the first embodiment, a specific example of an ethylene-α-olefin copolymer other than a specific ethylene-1-butene copolymer is the ethylene-α-olefin copolymer (X1) contained in the adherend rubber composition described above, so a description thereof will be omitted here. In addition, the specific ethylene-propylene copolymer of a second embodiment described below may be used as an ethylene-α-olefin copolymer other than a specific ethylene-1-butene copolymer.

Organic Peroxide (Y2)

The rubber composition for adhesion in the first embodiment contains an organic peroxide (Y2). A specific example of an organic peroxide is the organic peroxide (Y1) described in the adherend rubber composition described above, so a description thereof will be omitted here.

In addition, the content of the organic peroxide (Y2) is preferably from 0.017 to 0.022 molar equivalents and more preferably from 0.018 to 0.021 molar equivalents relative to the ethylene-α-olefin copolymer (X2) contained in the rubber composition for adhesion in the first embodiment.

Other Components

The rubber composition for adhesion in the first embodiment preferably contains carbon black. A specific example of such carbon black is the carbon black which may be contained in the adherend rubber composition described above, so a description thereof will be omitted here.

The content when carbon black is contained is preferably from 30 to 60 parts by mass per 100 parts by mass of the ethylene-α-olefin copolymer (X2) contained in the rubber composition for adhesion in the first embodiment.

In addition to the components described above, the rubber composition for adhesion in the first embodiment may contain compounding agents such as a filler other than carbon black (e.g., silica), an anti-aging agent, an antioxidant, a pigment (dye), a plasticizer, a softening agent, a flame retardant, a vulcanization accelerator, a wax, an antistatic agent, and a processing aid, if necessary, as in the case of the adherend rubber composition described above.

Method for Producing Rubber Composition for Adhesion

The rubber composition for adhesion in the first embodiment can be produced by kneading each component described above with a Banbury mixer or the like, as in the case of the adherend rubber composition described above.

In addition, an unvulcanized rubber component serving as the rubber for adhesion described in the first embodiment is the rubber for adhesion itself in the first embodiment.

Further, a vulcanized rubber composition serving as the rubber for adhesion described above in the first embodiment can be obtained, for example, by vulcanizing the rubber composition for adhesion described above in the first embodiment under heat conditions at a temperature of from 150 to 170° C. for 0.5 hours.

Adhesion Aspect

The adhesion method in the first embodiment is a method of adhering the adherend rubbers described above to one another using the rubber for adhesion of the first embodiment described above at at least the adhesion interface between the adherend rubbers.

Here, "using at the adhesion interface" refers to dispose the rubber for adhesion at the adhesion interface between adherend rubbers.

Suitable examples of the adhesion method include, but are not particularly limited to, a method in which the rubber for adhesion is disposed at the adhesive interface between the adherend rubbers and they are pressed under heating. A condition of pressing under heating is not particularly limited since the condition varies depending on the type of the ethylene-α-olefin copolymer and the type of the organic peroxide. For example, when an ethylene-1-butene copolymer (EBM) is used as the ethylene-α-olefin copolymer and 1,3-bis(t-butylperoxyisopropyl)benzene is used as the organic peroxide, a condition of pressing at approximately 1 MPa under heating at a temperature of from 150 to 170° C. for from 30 minutes to 2 hours is preferred.

The adhesion method of the first embodiment facilitates endless processing for rubber products (especially, in an elongated form). Therefore, the adhesion method is preferably used in bonding together rubber products having excellent heat resistance, in particular, conveyor belts.

The conveyor belt of the first embodiment is a conveyor belt obtained by adhesion by the adhesion method according to the first embodiment described above. Specifically, the conveyor belt can be obtained by overlapping an end of a conveyor belt and an end of another conveyor belt, disposing the rubber for adhesion of the first embodiment at the interface where the ends are overlapped, and pressing the ends under heating.

Second Embodiment

Adhesion Method

The adhesion method according to a second embodiment is a method of adhering adherend rubbers obtained from an adherend rubber composition containing an ethylene-α-olefin copolymer (X1) and an organic peroxide (Y1) to one another using a rubber for adhesion obtained from a rubber composition for adhesion containing an ethylene-α-olefin copolymer (X2) and an organic peroxide (Y2) at the adhesion interface between the adherend rubbers. The ethylene-α-olefin copolymer (X2) contained in the rubber composition for adhesion contains an ethylene-propylene copolymer. The ethylene-propylene copolymer has a number average molecular weight (Mn) of not less than 100000 and a molecular weight distribution (Mw/Mn) of not greater than 3 as determined from the weight average molecular weight (Mw) and the number average molecular weight (Mn). The content of the ethylene-propylene copolymer is from 30 to 100 mass % of the total mass of the ethylene-α-olefin copolymer (X2) contained in the rubber composition for adhesion.

In the second embodiment, including a specific amount of an ethylene-propylene copolymer having a specific number average molecular weight (Mn) and a specific molecular weight distribution (Mw/Mn) (also called a specific "ethylene-propylene copolymer" hereafter) in a rubber composition for adhesion makes it possible for adherend rubbers (rubber products) to be satisfactorily adhered to one another.

Although the details of this mechanism are not clear, the mechanism is presumed to be roughly as follows.

Specifically, an ethylene-propylene copolymer having a number average molecular weight (Mn) of not less than 100000 can be considered to be in a state in which the molecular chains constituting the copolymer are sufficiently long. When an ethylene-propylene copolymer having sufficiently long molecular chains is used in this way, the force intertwining the copolymer and an adherend rubber becomes strong.

In addition, an ethylene-propylene copolymer having a molecular weight distribution (Mw/Mn) of not greater than 3 can be considered to be in a state in which the abundance of long molecular chains is high. Using an ethylene-propylene copolymer in which the abundance of long molecular chains is high may increase the frequency of the intertwining of the copolymer and an adherend rubber.

Using a rubber for adhesion obtained from a rubber composition for adhesion containing a specific amount of an ethylene-propylene copolymer having a specific number average molecular weight (Mn) and a specific molecular weight distribution (Mw/Mn) causes the effects described above to be exhibited synergistically, which is presumed to allow adhered rubbers to satisfactorily adhere to one another.

Next, the adherend rubber and the rubber for adhesion of the second embodiment, and a specific aspect of adhering them to one another will be described.

Adherend Rubber

In the second embodiment, the adherend rubber is not particularly limited as long as it is obtained from a rubber composition for an adherend containing an ethylene-α-olefin copolymer (X1) and an organic peroxide (Y1) described below. The adherend rubber may be an unvulcanized rubber (hereinafter referred to as "unvulcanized rubber component") or a vulcanized rubber (hereinafter referred to as "vulcanized rubber component"), and is preferably an unvulcanized rubber component.

Further, the adhesion of adherend rubbers to one another includes not only an aspect of adhering vulcanized rubber components or unvulcanized rubber components to one another, but also an aspect of adhering a vulcanized rubber component to an unvulcanized rubber component.

The adherend rubber in the second embodiment is the same as the adherend rubber in the first embodiment, so the description thereof will be omitted here. In addition, the method of producing the adherend rubber in the second embodiment is also the same as that in the first embodiment, so the description thereof will be omitted here.

Rubber for Adhesion

In the second embodiment, the rubber for adhesion is not particularly limited as long as it is obtained from a rubber composition for adhesion described below containing an ethylene-α-olefin copolymer (X2) and an organic peroxide (Y2) and the ethylene-α-olefin copolymer (X2) contains a specific amount of a specific ethylene-propylene copolymer. The rubber for adhesion may be an unvulcanized rubber composition or a vulcanized rubber composition but is preferably an unvulcanized rubber composition.

Ethylene-α-Olefin Copolymer (X2)

The rubber composition for adhesion in the second embodiment contains an ethylene-α-olefin copolymer (X2). Specific Ethylene-Propylene Copolymer The ethylene-α-olefin copolymer (X2) described above contains a specific ethylene-propylene copolymer. In the second embodiment, the specific ethylene-propylene copolymer refers to a copolymer having a number average molecular weight of not less than 100000 and a molecular weight distribution (Mw/Mn) of not greater than 3, as described above.

The number average molecular weight (Mn) of the specific ethylene-propylene copolymer needs to be not less than 100000 and is preferably from 100000 to 200000, more preferably from 120000 to 180000 and even more preferably from 140000 to 160000.

When the number average molecular weight (Mn) is not less than 100000 in this way, the adhesive strength of the rubber for adhesion is enhanced. In addition, when the number average molecular weight (Mn) is not greater than 200000, it becomes easy to control the viscosity or the like of the rubber composition for adhesion to within a preferable range, which tends to enhance the handleability of the rubber composition for adhesion. On the other hand, when the number average molecular weight (Mn) is less than 100000, the adhesive strength of the rubber for adhesion decreases, and the adhesion between adherend rubbers decreases.

The molecular weight distribution (Mw/Mn) of the specific ethylene-propylene copolymer needs to be not greater than 3 and is preferably from 1.5 to 2.5 and more preferably from 1.8 to 2.2.

When the molecular weight distribution (Mw/Mn) is not greater than 3 in this way, the adhesive strength of the rubber for adhesion is enhanced. On the other hand, when the molecular weight distribution (Mw/Mn) exceeds 3, the adhesive strength of the rubber for adhesion decreases, and the adhesion between adherend rubbers decreases.

Note that setting the molecular weight distribution (Mw/Mn) to less than 1.5 involves technical difficulties, so the lower limit of the molecular weight distribution (Mw/Mn) is preferably not less than 1.5.

The ethylene content of the specific ethylene-propylene copolymer is preferably from 40 to 80 mass % and more preferably from 45 to 65 mass %. When the ethylene content is not less than 40 mass %, the adhesion at room temperature between adherend rubbers tends to be further enhanced. In addition, when the ethylene content is not greater than 80 mass %, the processability tends to be enhanced.

One type of such a specific ethylene-propylene copolymer may be used alone, or two or more types may be used in combination.

When a commercially available product is used as the specific ethylene-propylene copolymer, an example thereof is an ethylene-propylene copolymer having a number average molecular weight (Mn) of 143000, a molecular weight distribution (Mw/Mn) of 1.9, and an ethylene content of 49 mass % (trade name "Keltan 3050", manufactured by LANXESS).

The content of the specific ethylene-propylene copolymer needs to be from 30 to 100 mass % and is preferably from 40 to 100 mass %, more preferably from 60 to 100 mass %, and even more preferably from 80 to 100 mass % of the total mass (100 mass %) of the ethylene-α-olefin copolymer (X2) contained in the aforementioned rubber composition for adhesion.

When the content of the specific ethylene-propylene copolymer is not less than 30 mass %, the adhesive strength of the rubber for adhesion is exhibited favorably. On the other hand, when the content of the specific ethylene-propylene copolymer is less than 30 mass %, the adhesive strength of the rubber for adhesion is not sufficiently exhibited, and the adhesion between the adherend rubbers decreases.

Other Ethylene-α-Olefin Copolymers

The ethylene-α-olefin copolymer (X2) in the second embodiment may contain an ethylene-α-olefin copolymer other than a specific ethylene-propylene copolymer.

In the second embodiment, a specific example of an ethylene-α-olefin copolymer other than a specific ethylene-propylene copolymer includes the ethylene-α-olefin copolymer (X1) contained in the rubber composition for adhesion described above, so a description thereof will be omitted here. In addition, the specific ethylene-1-butene copolymer of the first embodiment described above may be used as an ethylene-α-olefin copolymer other than a specific ethylene-propylene copolymer.

Organic Peroxide (Y2)

The rubber composition for adhesion in the second embodiment contains an organic peroxide (Y2). A specific example of an organic peroxide is the organic peroxide (Y1) described in the rubber composition for an adherend described above, so a description thereof will be omitted here.

In addition, the content of the organic peroxide (Y2) is preferably from 0.017 to 0.022 molar equivalents and more preferably from 0.018 to 0.021 molar equivalents relative to the ethylene-α-olefin copolymer (X2) contained in the rubber composition for adhesion in the second embodiment.

Other Components

The adherend rubber composition in the second embodiment preferably contains carbon black. A specific example of such a carbon black includes the carbon black which may be contained in the rubber composition for an adherend described above, so a description thereof will be omitted here.

The content when carbon black is contained is preferably from 30 to 60 parts by mass per 100 parts by mass of the ethylene-α-olefin copolymer (X2) contained in the rubber composition for adhesion in the second embodiment.

In addition to the components described above, the rubber composition for adhesion in the second embodiment may contain ingredients such as a filler other than carbon black (e.g., silica), an anti-aging agent, an antioxidant, a pigment (dye), a plasticizer, a softening agent, a flame retardant, a vulcanization accelerator, a wax, an antistatic agent, and a processing aid, if necessary, as in the case of the rubber composition for an adherend described above.

Method for Producing Rubber Composition for Adhesion

The rubber composition for adhesion in the second embodiment can be produced by kneading each component described above with a Banbury mixer or the like, as in the case of the rubber composition for an adherend described above.

In addition, an unvulcanized rubber composition serving as the rubber for adhesion described in the second embodiment is the rubber composition for adhesion itself in the second embodiment.

Further, a vulcanized rubber composition serving as the adherend rubber described above in the second embodiment can be obtained by vulcanizing the rubber composition for adhesion of the second embodiment described above under heating conditions at a temperature of approximately from 150 to 170° C. for 0.5 hours.

Adhesion Aspect

The adhesion method in the second embodiment is a method of adhering the adherend rubbers described above to one another using the rubber for adhesion of the second embodiment described above at at least the adhesion interface between the adherend rubbers.

Here, "using at the adhesion interface" refers to disposing the rubber for adhesion at the adhesion interface between adherend rubbers.

Suitable examples of the adhesion method of the second embodiment include, but are not particularly limited to, a method in which the rubber for adhesion is disposed at the adhesive interface between the adherend rubbers and they are pressed under heating. A condition of pressing under heating is not particularly limited since the condition is varied depending on the type of the ethylene-α-olefin copolymer and the type of the organic peroxide. For example, when an ethylene-propylene copolymer (EPM) is used as the ethylene-α-olefin copolymer and 1,3-bis(t-butylperoxyisopropyl)benzene is used as the organic peroxide, a condition of pressing at approximately 1 MPa under heating at from 150 to 170° C. for from 30 minutes to 2 hours is preferred.

The adhesion method of the second embodiment can facilitate endless processing for rubber products (especially, in an elongated form). Therefore, the adhesion method is preferably used in bonding together rubber products having excellent heat resistance such as conveyor belts.

The conveyor belt of the second embodiment is a conveyor belt obtained by adhesion by the adhesion method described in the second embodiment described above. Specifically, the conveyor belt can be obtained by overlapping an end of a conveyor belt and an end of another conveyor belt, disposing the rubber for adhesion at the interface where the ends are overlapped, and pressing the ends under heating.

EXAMPLES

Hereinafter, the adhesion method of the present technology will be described in further detail with reference to examples for each of the embodiments described above; however, the present technology is not limited thereto. In the following tables, the abbreviation R.C. is used as an abbreviation of "rubber composition."

First Embodiment

Preparation of Rubber Composition

Each rubber composition was prepared using the composition components shown in Table 1-1 below in amounts (part by mass) (molar equivalent for an organic peroxide) relative to 100 parts by mass of a rubber component including an ethylene-α-olefin copolymer.

Specifically, a master batch was obtained by first kneading the components shown in Table 1-1 below, except for a crosslinking agent and an organic peroxide, for 5 minutes in a (3.4 L) Banbury mixer, and then discharging the kneaded product when the temperature reached 160° C. Each rubber composition was obtained by then kneading the obtained master batch with the crosslinking agent and the organic peroxide with an open roll.

TABLE 1-1

|  | R.C. 1-1 | R.C. 1-2 | R.C. 1-3 | R.C. 1-4 | R.C. 1-5 |
|---|---|---|---|---|---|
| EPM-1 | 100 | 70 |  |  |  |
| EPM-2 |  |  |  |  | 40 |

TABLE 1-1-continued

|  | R.C. 1-1 | R.C. 1-2 | R.C. 1-3 | R.C. 1-4 | R.C. 1-5 |
|---|---|---|---|---|---|
| EBM-1 |  |  | 100 |  |  |
| EBM-2 |  | 30 |  | 100 | 60 |
| Carbon black | 50 | 50 | 40 | 40 | 45 |
| Zinc oxide | 5 | 5 | 5 | 5 | 5 |
| Stearic acid | 1 | 1 | 1 | 1 | 1 |
| Anti-aging agent | 8 | 8 | 8 | 8 | 8 |
| Crosslinking agent | 3 | 3 | 3 | 3 | 3 |
| Plasticizer | 15 | 15 | 15 | 15 | 15 |
| Organic peroxide (molar equivalent) | 0.013 | 0.013 | 0.018 | 0.018 | 0.013 |

The details of the components listed in Table 1-1 are as follows.

EPM-1: ethylene-propylene copolymer (EPT-0045, manufactured by Mitsui Chemicals, Inc.); Mooney viscosity: 26; number average molecular weight (Mn): 71000; molecular weight distribution (Mw/Mn): 3.8; ethylene content: 51 mass %

EPM-2: ethylene-propylene copolymer (KEP-110, manufactured by KUMHO POLYCHEM); Mooney viscosity: 26; number average molecular weight (Mn): 78000; molecular weight distribution (Mw/Mn): 4; ethylene content: 51.5 mass %

EBM-1: ethylene-1-butene copolymer (Engage 7467, manufactured by Dow Chemical Corporation); Mooney viscosity: 19; number average molecular weight (Mn): 98000; molecular weight distribution (Mw/Mn): 1.8; ethylene content: 74 mass %

EBM-2: ethylene-1-butene copolymer (Engage 7487, manufactured by Dow Chemical Corporation); Mooney viscosity: 47; number average molecular weight (Mn): 142000; molecular weight distribution (Mw/Mn): 2.0; ethylene content: 74 mass %

Carbon black: Niteron #300 (manufactured by NSCC Carbon Co., Ltd.)

Zinc oxide: Zinc Oxide #3 (manufactured by Seido Chemical Industry Co., Ltd.)

Stearic acid: stearic acid 505 (manufactured by Chiba Fatty Acid Co., Ltd.)

Anti-aging agent: NOCRAC MMB (manufactured by Ouchi Shinko Chemical Industrial Co., Ltd.)

Crosslinking agent: magnesium dimethacrylate (Hi-Cross GT, manufactured by Seiko Chemical Co., Ltd.)

Plasticizer: Lucant HC-3000X (manufactured by Mitsui Chemicals, Inc.)

Organic peroxide: 1,3-bis(t-butylperoxyisopropyl)benzene (Perkadox 14-40, manufactured by Kayaku Akzo Corporation)

The molecular weight distribution (Mw/Mn) described above was calculated from the values of the number average molecular weight (Mn) and the weight average molecular weight (Mw) determined by gel permeation chromatography (GPC) measurements on the basis of polystyrene.

Specifically, the number average molecular weight (Mn) and the weight average molecular weight (Mw) were measured under conditions with a column temperature of 40° C. using a device in which three columns (MIXED-B manufactured by Polymer Laboratories) were connected in series as a measurement instrument, a differential refractometer (RI-8020 manufactured by Toso) as a detector, and tetrahydrofuran as an eluent.

The Mooney viscosity (ML1+4, 125° C.) was measured using a Mooney viscometer (trade name: "VR-1130") and using an L-type rotor at a test temperature of 125° C. with a preheating time of 1 minute and a rotor-rotation time of 4 minutes in accordance with JIS K6300-1-2001.

Examples 1-1 to 1-4 and Comparative Examples 1-1 and 1-2

Using each of the rubber compositions shown in Table 1-1, an adherend rubber and an unvulcanized rubber for adhesion were adhered.

Specifically, the adherend rubber including a rubber composition shown in Table 1-2 below (having a thickness of 5 mm) was bonded to the rubber for adhesion including a rubber composition shown in Table 1-2 below (having a thickness of 5 mm), followed by pressing under heating at 150° C. for 60 minutes. A sample shape was produced in accordance with "Peel strength to cloth" of JIS K6256-1:2006.

Peel Force

A peel force (N/mm) was measured via a peeling test under conditions of room temperature (23° C.) and 150° C. in accordance with "peel strength to cloth" of JIS K6256-1:2006.

TABLE 1-2

|  | Comparative Examples | | Examples | | | |
|---|---|---|---|---|---|---|
|  | 1-1 | 1-2 | 1-1 | 1-2 | 1-3 | 1-4 |
| Adherend rubber | R.C. 1-1 | R.C. 1-2 | R.C. 1-2 | R.C. 1-2 | R.C. 1-2 | R.C. 1-1 |
| Rubber for adhesion | R.C. 1-1 | R.C. 1-2 | R.C. 1-3 | R.C. 1-4 | R.C. 1-5 | R.C. 1-5 |
| Peel force (23° C.) (N/mm) | 7.0 | 12.7 | 20.0 | 19.6 | 16.3 | 13.1 |
| Peel force (150° C.) (N/mm) | 1.2 | 2.7 | 6.2 | 5.8 | 7.1 | 5.5 |

It can be seen from the results shown in Table 1-2 that when a rubber composition for adhesion containing not less than 60 mass % of an ethylene-1-butene copolymer is used, the peel force at room temperature (23° C.) and at 150° C. becomes large, and the adhesion between rubber products is enhanced (Examples 1-1 to 1-4).

On the other hand, it can be seen that when the rubber composition for adhesion does not contain not less than 60 mass % of an ethylene-1-butene copolymer, the peel force at room temperature (23° C.) and at 150° C. becomes small, and the adhesion between rubber products is diminished (Comparative Examples 1-1 and 1-2).

Second Embodiment

Preparation of Rubber Composition

Each rubber composition was prepared using the composition components shown in Table 2-1 below in amounts (part by mass) (molar equivalent for an organic peroxide) relative to 100 parts by mass of a rubber component including an ethylene-α-olefin copolymer.

Specifically, a master batch was obtained by first kneading the components shown in Table 2-1 below, except for a crosslinking agent and an organic peroxide, for 5 minutes in a (3.4 L) Banbury mixer, and then discharging the kneaded product when the temperature reached 160° C. Each rubber composition was obtained by then kneading the obtained master batch with the crosslinking agent and the organic peroxide with an open roll.

TABLE 2-1

|  | R.C. 2-1 | R.C. 2-2 | R.C. 2-3 | R.C. 2-4 | R.C. 2-5 | R.C. 2-6 | R.C. 2-7 |
|---|---|---|---|---|---|---|---|
| EPM-1 | 100 | 70 |  |  | 80 |  |  |
| EPM-2 |  |  |  | 30 |  |  |  |
| EPM-3 |  |  | 100 | 40 | 20 |  |  |
| EPM-4 |  |  |  |  |  | 100 |  |
| EPM-5 |  |  |  |  |  |  | 100 |
| EBM-2 |  | 30 |  | 30 |  |  |  |
| Carbon black | 50 | 50 | 40 | 50 | 50 | 50 | 50 |
| Zinc oxide | 5 | 5 | 5 | 5 | 5 | 5 | 5 |
| Stearic acid | 1 | 1 | 1 | 1 | 1 | 1 | 1 |
| Anti-aging agent | 8 | 8 | 8 | 8 | 8 | 8 | 8 |
| Crosslinking agent | 3 | 3 | 3 | 3 | 3 | 3 | 3 |
| Plasticizer | 15 | 15 | 15 | 15 | 15 | 15 | 15 |
| Organic peroxide (molar equivalent) | 0.013 | 0.013 | 0.018 | 0.013 | 0.013 | 0.013 | 0.013 |

Each of the components in Table 2-1 that are not listed in Table 1-1 will be described hereinafter.

EPM-3: ethylene-propylene copolymer (Keltan 3050, manufactured by LANXESS), number average molecular weight (Mn): 143000; molecular weight distribution (Mw/Mn): 1.9; ethylene content: 49 mass %

EPM-4: ethylene-propylene copolymer (VISTALON 503K, manufactured by ExxonMobile Chemical Co.); number average molecular weight (Mn): 100000; molecular weight distribution (Mw/Mn): 3.7; ethylene content: 54.5 mass %

EPM-5: ethylene-propylene copolymer (Dutral CO 043, manufactured by POLIMER); number average molecular weight (Mn): 72000; molecular weight distribution (Mw/Mn): 2.4; ethylene content: 55 mass %

Note that the molecular weight distribution (Mw/Mn) of EPM-3 to EPM-5 was measured in the same manner as in the first embodiment in the examples section.

Examples 2-1 to 2-3 and Comparative Examples 2-1 to 2-5

Using each of the compositions shown in Table 2-1, an adherend rubber and an unvulcanized rubber for adhesion were adhered.

Specifically, the adherend rubber including a rubber composition shown in Table 2-2 below (having a thickness of 5 mm) was bonded to the rubber for adhesion including a rubber composition shown in Table 2-2 below (having a thickness of 5 mm), followed by pressing under heating at 150° C. for 60 minutes. A sample shape was produced in accordance with "Peel strength to cloth" of JIS K6256-1:2006.

Peel Force

A peel force (N/mm) was measured via a peeling test under conditions of room temperature (23° C.) and 150° C. in accordance with "peel strength to cloth" of JIS K6256-1:2006.

TABLE 2-2

|  | Comparative Examples | | | | | Examples | | |
|---|---|---|---|---|---|---|---|---|
|  | 2-1 | 2-2 | 2-3 | 2-4 | 2-5 | 2-1 | 2-2 | 2-3 |
| Adherend rubber | R.C. 2-1 | R.C. 2-2 | R.C. 2-2 | R.C. 2-2 | R.C. 2-2 | R.C. 2-2 | R.C. 2-4 | R.C. 2-3 |
| Rubber for adhesion | R.C. 2-1 | R.C. 2-2 | R.C. 2-5 | R.C. 2-6 | R.C. 2-7 | R.C. 2-3 | R.C. 2-4 | R.C. 2-4 |
| Peel force (23° C.) (N/mm) | 7.0 | 12.7 | 12.0 | 10.6 | 9.8 | 17.8 | 14.0 | 15.5 |
| Peel force (150° C.) (N/mm) | 1.2 | 2.7 | 2.5 | 2.4 | 1.7 | 6.4 | 6.6 | 6.5 |

It can be seen from the results shown in Table 2-2 that when a rubber composition for adhesion containing not less than 30 mass % of an ethylene-propylene copolymer having a number average molecular weight (Mn) of not less than 100000 and a molecular weight distribution (Mw/Mn) of not greater than 3 is used, the peel force at room temperature (23° C.) and at 150° C. becomes large, and the adhesion between rubber products is enhanced (Examples 2-1 to 2-3).

On the other hand, it can be seen that even if the rubber composition for adhesion contains an ethylene-propylene copolymer, when the rubber composition for adhesion does not contain not less than 30 mass % of an ethylene-propylene copolymer having a number average molecular weight (Mn) of not less than 100000 and a molecular weight distribution (Mw/Mn) of not greater than 3, the peel force at room temperature (23° C.) and at 150° C. becomes large, and the adhesion between rubber products is diminished (Examples 2-1 to 2-5).

The invention claimed is:

1. A method of adhering vulcanized adherend rubbers, obtained from a rubber composition for an adherend containing an ethylene-α-olefin copolymer (X1) and an organic peroxide (Y1), to one another using a rubber for adhesion obtained from a rubber composition for adhesion comprising at least one ethylene-α-olefin copolymer (X2) and an organic peroxide (Y2) at an adhesion interface between the adherend rubbers;

the at least one ethylene-α-olefin copolymer (X2) contained in the rubber composition for adhesion comprising an ethylene-1-butene copolymer;

the ethylene-1-butene copolymer having a number average molecular weight (Mn) of not less than 80000 and a molecular weight distribution (Mw/Mn) of not greater than 3 as determined from a weight average molecular weight (Mw) and the number average molecular weight (Mn); and a content of the ethylene-1-butene copolymer being from 60 to 70 mass % of a total mass of the at least one ethylene-α-olefin copolymer (X2) contained in the rubber composition for adhesion;

wherein the rubber composition for adhesion is an unvulcanized rubber composition.

2. The method according to claim 1, wherein an ethylene content of the ethylene-1-butene copolymer is from 50 to 90 mass %.

3. The method according to claim 2 used in bonding of conveyor belts to one another.

4. A conveyor belt obtained by adhesion by the method described in claim 3.

5. The method according to claim 1 used in bonding of conveyor belts to one another.

6. A conveyor belt obtained by adhesion by the method described in claim 5.

7. The adhesion method according to claim 1, wherein the adhesion interface between the adherend rubbers is an interface where the adherends are overlapped.

8. The adhesion method according to claim 1, wherein the adhesion interface between the adherend rubbers is an interface where the adherends are overlapped, and the rubber for adhesion is disposed at the adhesion interface and pressed under heating.

* * * * *